United States Patent
Lindoff et al.

(10) Patent No.: US 10,069,678 B2
(45) Date of Patent: Sep. 4, 2018

(54) CONFIGURATION OF WIRELESS TERMINALS BASED UPON DISCOVERY OF OTHER WIRELESS TERMINALS IN THE VICINITY USING SHORT RANGE COMMUNICATIONS

(71) Applicant: Telefonaktiebolaget LM Ericsson (publ), Stockholm (SE)

(72) Inventors: Bengt Lindoff, Bjarred (SE); Imadur Rahman, Sollentuna (SE); Leif Wilhelmsson, Dalby (SE)

(73) Assignee: TELEFONAKTIEBOLAGET LM ERICSSON (publ), Stockholm (SE)

( * ) Notice: Subject to any disclaimer, the term of this patent is extended or adjusted under 35 U.S.C. 154(b) by 56 days.

(21) Appl. No.: 15/122,919

(22) PCT Filed: Mar. 6, 2014

(86) PCT No.: PCT/EP2014/054316
§ 371 (c)(1),
(2) Date: Aug. 31, 2016

(87) PCT Pub. No.: WO2015/131946
PCT Pub. Date: Sep. 11, 2015

(65) Prior Publication Data
US 2017/0078139 A1    Mar. 16, 2017

(51) Int. Cl.
*H04L 12/24* (2006.01)
*H04W 76/14* (2018.01)
(Continued)

(52) U.S. Cl.
CPC ......... *H04L 41/0803* (2013.01); *H04W 4/008* (2013.01); *H04W 4/80* (2018.02);
(Continued)

(58) Field of Classification Search
CPC .......... H04L 41/0803; H04W 72/0406; H04W 4/008; H04W 36/0083; H04W 36/32
(Continued)

(56) References Cited

U.S. PATENT DOCUMENTS 7,974,634 B2 * 7/2011 Aaron ................. H04W 72/005
455/422.1
2001/0046867 A1 * 11/2001 Mizoguchi ............ H04B 7/005
455/452.2
(Continued)

FOREIGN PATENT DOCUMENTS

EP    1294135 A1    3/2003
GB    2498395 A     7/2013
(Continued)

OTHER PUBLICATIONS

PCT International Search Report, dated Dec. 10, 2014, in connection with International Application No. PCT/EP2014/054316, all pages.
(Continued)

*Primary Examiner* — Mohammad S Anwar
(74) *Attorney, Agent, or Firm* — Leffler Intellectual Property Law, PLLC (57) ABSTRACT

There is provided configuration of wireless terminals. A request is transmitted to wireless terminals to detect other wireless terminals within short-range communications range of the wireless terminals. Responses to the request are received, where the responses comprise information of detected other wireless terminals. Clustering of the wireless terminals and the other wireless terminals is determined based on the responses. At least one of the wireless terminals is configured according to the determined clustering.

22 Claims, 5 Drawing Sheets

(51) Int. Cl.
*H04W 4/80* (2018.01)
*H04W 72/04* (2009.01)
*H04W 72/08* (2009.01)
*H04W 4/00* (2018.01)
*H04W 36/00* (2009.01)
*H04W 76/02* (2009.01)
*H04W 36/30* (2009.01)
*H04W 36/32* (2009.01)
*H04W 88/02* (2009.01)

(52) U.S. Cl.
CPC ... *H04W 36/0083* (2013.01); *H04W 72/0406* (2013.01); *H04W 72/048* (2013.01); *H04W 72/0446* (2013.01); *H04W 72/082* (2013.01); *H04W 76/023* (2013.01); *H04W 76/14* (2018.02); *H04W 36/30* (2013.01); *H04W 36/32* (2013.01); *H04W 88/02* (2013.01)

(58) Field of Classification Search
IPC .................................................. H04L 41/0803
See application file for complete search history.

(56) References Cited

U.S. PATENT DOCUMENTS

| | | | | |
|---|---|---|---|---|
| 2009/0010228 | A1* | 1/2009 | Wang | H04B 1/7105 370/335 |
| 2010/0093364 | A1 | 4/2010 | Ribeiro et al. | |
| 2011/0182280 | A1 | 7/2011 | Charbit et al. | |
| 2012/0071190 | A1* | 3/2012 | Choi | H04L 5/0037 455/517 |
| 2012/0322484 | A1 | 12/2012 | Yu et al. | |
| 2013/0073671 | A1* | 3/2013 | Nagpal | H04W 76/023 709/217 |
| 2013/0077548 | A1* | 3/2013 | Park | H04W 52/46 370/311 |
| 2013/0281076 | A1* | 10/2013 | Damnjanovic | H04W 8/22 455/418 |
| 2013/0295976 | A1 | 11/2013 | Patil et al. | |
| 2014/0106774 | A1* | 4/2014 | Siomina | H04W 64/00 455/456.1 |

FOREIGN PATENT DOCUMENTS

WO 2012015698 A1 2/2012
WO 2013126222 A1 8/2013

OTHER PUBLICATIONS

PCT Written Opinion, dated Dec. 10, 2014, in connection with International Application No. PCT/EP2014/054316, all pages.
European Patent Office Communication, dated Feb. 28, 2018, in connection with counterpart European Patent Application No. 14 708 852.0, all pages.

* cited by examiner

CONFIGURATION OF WIRELESS TERMINALS BASED UPON DISCOVERY OF OTHER WIRELESS TERMINALS IN THE VICINITY USING SHORT RANGE COMMUNICATIONS

TECHNICAL FIELD

Embodiments presented herein relate to configuration of wireless terminals, and particularly to methods, a network node, a wireless terminal, computer programs, and a computer program product for configuring wireless terminals.

BACKGROUND

In communications networks, there is always a challenge to obtain good performance and capacity for a given communications protocol, its parameters and the physical environment in which the communications network is deployed.

For example, time-division duplex (TDD) operation is supported by the mobile communication standard Long Term Evolution (LTE). In TDD the uplink (UL) and downlink (DL) share the same carrier frequency. This has an advantage compared to frequency-division duplex (FDD), using different carriers for UL and DL, in the terms that only one carrier is needed for the communication. Furthermore, TDD is, in theory, rather flexible since the UL/DL sub frame allocation could be adapted based on current traffic need.

In practical TDD deployments, the possibility to use different UL/DL sub frame allocation in different cells are rather limited, both for cells using the same carrier frequency and for cells using adjacent carrier frequencies. This is mainly due to large dynamics in the communications network, where the received signal power level could be, for example, around −100 dBm, while the transmitted signal power level could be, for example, above 20 dBm, i.e., a dynamic range of 120 dB.

Therefore, if one wireless terminal transmits with higher power at the same time as another wireless terminal receives a signal with lower power while being located in close vicinity of each other, there may be (up to) 100 dB or larger interference levels than signal level. Assuming ideal transceivers it would be possible to deploy different UL/DL allocations on adjacent TDD carriers, but due to real-world imperfections, including non-linear elements, there will be transmission (TX) leakage which means that the transmitted signal also interferes with the transmissions in the adjacent channels. A TX leakage ratio in the range of 30-40 dB may be acceptable. The ratio is defined as the ratio between total interference power seen at the adjacent carrier due to transmission in the desired carrier and the transmission power at the desired carrier. The resulting leakage power generally depends on the frequency location of the interfering system and the victim system. Thus closely spaced systems interfere each other in a more challenging way than two systems placed further apart in frequency.

One way to handle such issues, according to the state of the art, is to have coordination between the network (NW) nodes (such as between the radio base stations). However there are several issues associated therewith. The NW nodes may not be operatively connected; for instance even if coordination between NW nodes is possible, there may not be any information about the relative location of the wireless terminals. Hence denying extra UL slots only due to that one active wireless terminal is present in an adjacent NW node may be too restrictive. Moreover, the interfering and victim system may be operated by different operators, thus any communications between the NW nodes may not be possible.

Hence, there is still a need for an improved configuration of wireless terminals.

SUMMARY

An object of embodiments herein is to provide improved configuration of wireless terminals.

The inventors of the enclosed embodiments have through a combination of practical experimentation and theoretical derivation discovered that improved configuration of wireless terminals may be accomplished by considering whether a specific wireless terminal is in a need of transmitting at a time and/frequency resource in the vicinity of other wireless terminals, such that the specific wireless terminal may cause significant interference to the reception of the other wireless terminals.

A particular object is therefore to define an improved configuration of wireless terminals whereby device-to-device interference is avoided, or at least reduced.

According to a first aspect there is presented a method for configuring wireless terminals. The method is performed by a network node. The method comprises transmitting a request to wireless terminals operatively connected to the network node to detect other wireless terminals within short-range communications range of the wireless terminals. The method comprises receiving responses to the request, where the responses comprise information of detected other wireless terminals. The method comprises determining clustering of the wireless terminals and the other wireless terminals based on the responses. The method comprises configuring at least one of the wireless terminals according to the determined clustering.

Advantageously this provides efficient configuration of wireless terminals.

Advantageously this provides efficient configuration of wireless terminals where device-to-device interference is avoided, or at least reduced.

Advantageously this enables increased network efficiency by taking the actual interference situation into account rather than basing the scheduling on worst case assumptions which many times may not reflect reality.

According to a second aspect there is presented a network node for configuring wireless terminals. The network node comprises a processing unit and a non-transitory computer readable storage medium. The non-transitory computer readable storage medium comprises instructions executable by the processing unit. The network node is operative to transmit a request to wireless terminals operatively connected to the network node to detect other wireless terminals within short-range communications range of the wireless terminals. The network node is operative to receive responses to the request, where the responses comprise information of detected other wireless terminals. The network node is operative to determine clustering of the wireless terminals and the other wireless terminals based on the responses. The network node is operative to configure at least one of the wireless terminals according to the determined clustering.

According to a third aspect there is presented a computer program for configuring wireless terminals, the computer program comprising computer program code which, when run on a network node, causes the network node to perform a method according to the first aspect.

According to a fourth aspect there is presented a method for configuring a wireless terminal. The method is performed by the wireless terminal. The method comprises receiving a request from a network node to which the wireless device is operatively connected to detect other wireless terminals within short-range communications range of the wireless terminal. The method comprises transmitting a probing signal using an available short-range communications technology and monitoring any responses thereto from the other wireless terminals. The method comprises transmitting a result of the monitoring to the network node, where the result comprises information of detected other wireless terminals. The method comprises receiving configuration information based on the result from the network node.

According to a fifth aspect there is presented a wireless terminal for configuring the wireless terminal. The wireless terminal comprises a processing unit and a non-transitory computer readable storage medium. The non-transitory computer readable storage medium comprises instructions executable by the processing unit. The wireless terminal is operative to receive a request from a network node to which the wireless device is operatively connected to detect other wireless terminals within short-range communications range of the wireless terminal. The wireless terminal is operative to transmit a probing signal using an available short-range communications technology and to monitor any responses thereto from the other wireless terminals. The wireless terminal is operative to transmit a result of the monitoring to the network node, where the result comprises information of detected other wireless terminals. The wireless terminal is operative to receive configuration information based on the result from the network node.

According to a sixth aspect there is presented a computer program for configuring wireless terminals, the computer program comprising computer program code which, when run on a wireless terminal, causes the wireless terminal to perform a method according to the fourth aspect.

According to a seventh aspect there is presented a computer program product comprising a computer program according to at least one of the third aspect and the sixth aspect and a computer readable means on which the computer program is stored.

It is to be noted that any feature of the first, second, third, fourth, fifth, sixth, and seventh aspects may be applied to any other aspect, wherever appropriate. Likewise, any advantage of the first aspect may equally apply to the second, third, fourth, fifth, sixth, and/or seventh aspect, respectively, and vice versa. Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which.

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any step or feature illustrated by dashed lines should be regarded as optional.

Figure 1:
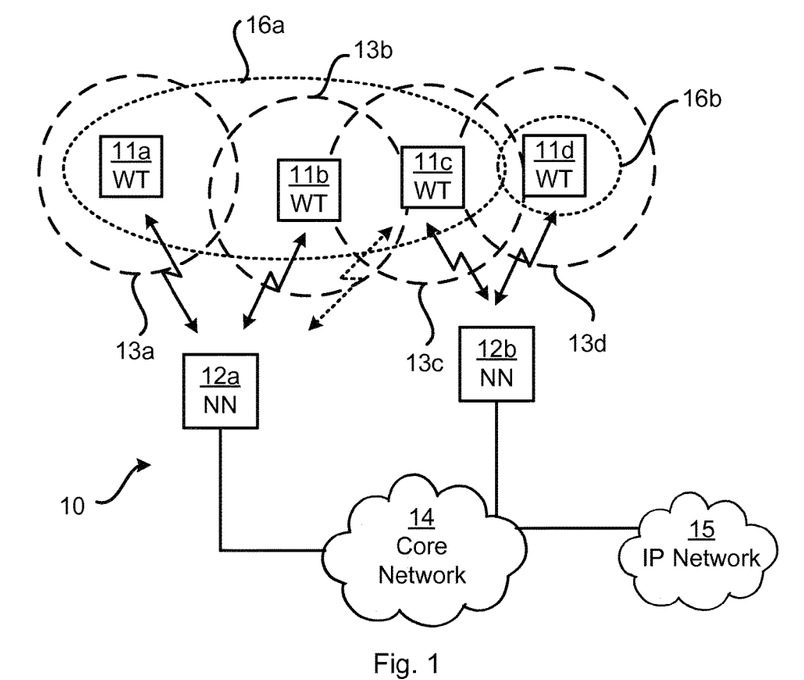
FIG. 1 is a schematic diagram illustrating a communication network according to embodiments.

FIG. 1 shows a schematic overview of an exemplifying communications network 10 where embodiments presented herein can be applied. The communications network 10 comprises network nodes (NN) 112a, 12b providing network coverage over cells (not shown). Wireless terminals 11a, 11b positioned in a particular cell are thus provided network service by the network node 12a serving that particular cell. As the skilled person understands, the communications network 10 may comprise a plurality of network nodes 12a, 12b. A plurality of wireless terminals 11a, 11b, 11c, 11d may be operatively connected to at least one of the plurality of network nodes 12a, 12b. Each wireless terminals 11a, 11b, 11c, 11d is arranged to transmit using at least one available short-range communications technology within a short-range communications range 13a, 13b, 13c, 13d. Examples of wireless terminals 11a, 11b, 11c, 11d include, but are not limited to end-user equipment such as mobile phones, tablet computers, laptop computers, sensors, and stationary computers.

The network nodes 12a, 12b are operatively connected to a core network 14. The core network 14 may provide services and data to the wireless terminals 11a, 11b, 11c, 11d operatively connected to the network nodes 12a, 12b from an external Internet Protocol (IP) packet switched data network 15. At least parts of the communications network 10 may generally comply with any one or a combination of W-CDMA (Wideband Code Division Multiplex), LTE (Long Term Evolution), EDGE (Enhanced Data Rates for GSM Evolution, GPRS (General Packet Radio Service)), CDMA2000 (Code Division Multiple Access 2000), WiFi, microwave radio links, HSPA (High Speed Packet Access), etc., as long as the principles described hereinafter are applicable.

Figure 4:
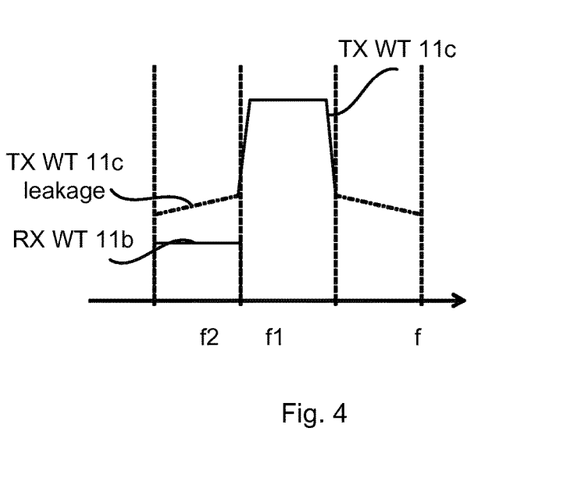
FIG. 4 schematically illustrates frequency leakage.

Assume that the wireless links between the network nodes 12a, 12b and the wireless terminals 11a, 11b, 11c, 11d are based on a time-division duplexing deployment. Assume that the two wireless terminals 11b, 11c are operatively connected to network nodes 12a, 12b using different but adjacent frequency carriers, f1 and f2, respectively. Though the network nodes 12a, 12b are shown to be located at different places, they could be co-located, thus the pathloss on the own carrier and adjacent carrier can be very similar, thus increasing the potential interference levels. Suppose the default uplink/downlink (UL/DL) pattern is 3DL/2UL per 5 ms and furthermore suppose that the wireless terminal 11b needs to increase the UL allocation due to large UL traffic. Assume that the wireless terminal 11b should transmit at time T1. Then when transmitting at T1, due to non-ideal transmitter, the transmission will create leakage on adjacent frequencies (i.e. f3). Now, assume that wireless terminal 11c is receiving data from the other network node 12b at time T1. Thus, if wireless terminal 11b and wireless terminal 11c are close (in a geographical sense), such that within short-range communications range 13b, 13c of each other (for example, in the order of 1-100 meters), there is a risk that the reception at wireless terminal 11c is significantly interfered by the transmission (TX) leakage from wireless terminal 11b. This is illustrated in FIG. 4. FIG. 4 schematically illustrates TX leakage from a frequency interval of the carrier frequency f1 into a frequency interval of the carrier frequency f2.

A similar situation may occur when two neighboring network nodes 12a, 12b use different UL/DL configurations. In this case, if two wireless terminals 11b, 11c are operatively connected to two different (and neighboring) network nodes 12a, 12b, there is a possibility that these two wireless terminals 11b, 11c may be close to each other. This could be the case for small cells scenarios, where a potentially large number of low power network nodes are deployed inside a not-so-large hotspot area. In this case, the device-to-device interference may be co-channel (i.e., both wireless terminal 11b and wireless terminal 11c use the same carrier frequency). This may result in a higher impact than the above disclosed scenario (i.e., where the two wireless terminals 11b, 11c are using different but adjacent frequency carriers).

The embodiments disclosed herein are based on utilizing proximity detection in the wireless terminals 11a, 11b, 11c, 11d in order to determine the interference situation for non-D2D communication. The proximity detection may be used to determine possibilities to transmit at a time and/or frequency resource with significantly risk of interfering reception of other wireless terminals 11a, 11b, 11c, 11d. Closely located wireless terminals 11a, 11b, 11c, 11d may be divided into two or more clusters, 16a, 16b. Particularly, the embodiments disclosed herein relate to configuring wireless terminals. In order to obtain configuration of wireless terminals there is provided a network node 12a, a method performed by the network node 12a, and a computer program comprising code, for example in the form of a computer program product, that when run on a network node 12a, causes the network node 12a to perform the method. In order to obtain configuration of there is further provided a wireless terminal 11a, 11b, 11c, 11d, a method performed by the wireless terminal 11a, 11b, 11c, 11d, and a computer program comprising code, for example in the form of a computer program product, that when run on a wireless terminal 11a, 11b, 11c, 11d, causes the wireless terminal 11a, 11b, 11c, 11d to perform the method.

Figure 2A:
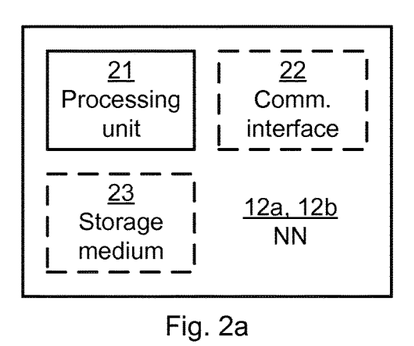
FIG. 2a is a schematic diagram showing functional units of a network node according to an embodiment.

FIG. 2a schematically illustrates, in terms of a number of functional units, the components of a network node 12a according to an embodiment. A processing unit 21 is provided using any combination of one or more of a suitable central processing unit (CPU), multiprocessor, microcontroller, digital signal processor (DSP), application specific integrated circuit (ASIC), field programmable gate arrays (FPGA) etc., capable of executing software instructions stored in a computer program product 31a, 31b (as in FIG. 3), e.g. in the form of a storage medium 23. Thus the processing unit 21 is thereby arranged to execute methods as herein disclosed. The a storage medium 23 may also comprise persistent storage, which, for example, can be any single one or combination of magnetic memory, optical memory, solid state memory or even remotely mounted memory. The network node 12a may further comprise a communications interface 22 for communications with wireless terminals 11a, 11b, 11c, 11d and other network nodes 12b. As such the communications interface 22 may comprise one or more transmitters and receivers, comprising analogue and digital components and a suitable number of antennas for radio communications and network ports for wired communications. The processing unit 21 controls the general operation of the network node 12a e.g. by sending data and control signals to the communications interface 22 and the storage medium 23, by receiving data and reports from the communications interface 22, and by retrieving data and instructions from the storage medium 23. Other components, as well as the related functionality, of the network node 12a are omitted in order not to obscure the concepts presented herein.

Figure 2B:
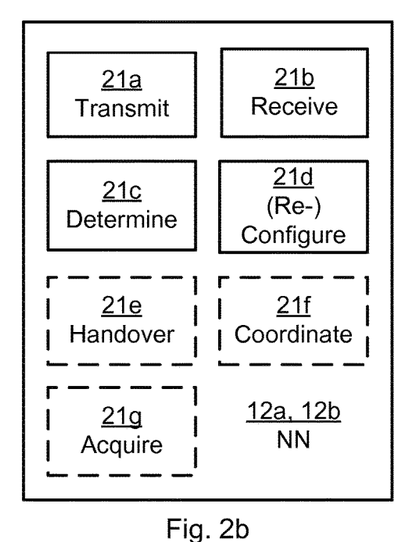
FIG. 2b is a schematic diagram showing functional modules of a network node according to an embodiment.

FIG. 2b schematically illustrates, in terms of a number of functional modules, the components of a network node 12a according to an embodiment. The network node 12a of FIG. 2b comprises a number of functional modules; a transmit module 21a, a receive module 21b, a determine module 21c, and a (re-)configuration module 21d. The network node 12a of FIG. 2b may further comprises a number of optional functional modules, such as any of a handover module 21e, a coordinate module 21f, and an acquire module 21g. The functionality of each functional module 21a-g will be further disclosed below in the context of which the functional modules 21a-g may be used. In general terms, each functional module 21a-g may be implemented in hardware or in software. The processing unit 21 may thus be arranged to from the storage medium 23 fetch instructions as provided by a functional module 21a-g and to execute these instructions, thereby performing any steps as will be disclosed hereinafter.

Figure 2C:
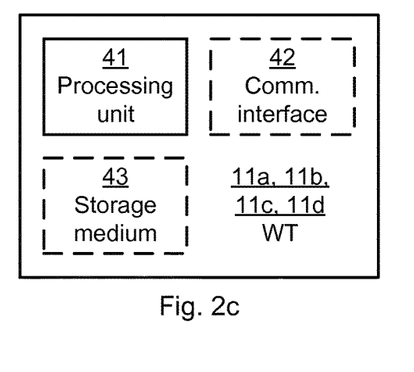
FIG. 2c is a schematic diagram showing functional units of a wireless terminal according to an embodiment.

FIG. 2c schematically illustrates, in terms of a number of functional units, the components of a wireless terminal 11a, 11b, 11c, 11d according to an embodiment. A processing unit 41 is provided using any combination of one or more of a suitable central processing unit (CPU), multiprocessor, microcontroller, digital signal processor (DSP), application specific integrated circuit (ASIC), field programmable gate arrays (FPGA) etc., capable of executing software instructions stored in a computer program product 31a, 31b (as in FIG. 3), e.g. in the form of a storage medium 43. Thus the processing unit 41 is thereby arranged to execute methods as herein disclosed. The a storage medium 43 may also comprise persistent storage, which, for example, can be any single one or combination of magnetic memory, optical memory, solid state memory or even remotely mounted memory. The wireless terminal 11a, 11b, 11c, 11d may further comprise a communications interface 42 for communications with a network node 12a, 12b and other wireless terminals 11a, 11b, 11c, 11d. As such the communications interface 42 may comprise one or more transmitters and receivers, comprising analogue and digital components and a suitable number of antennas for radio communications with the network node 12a, 12b, and a short-range communications technology interface for communications with the wireless terminals 11a, 11b, 11c, 11d, for example by transmitting a probing signal. The processing unit 41 controls the general operation of the wireless terminal 11a, 11b, 11c, 11d e.g. by sending data and control signals to the communications interface 42 and the storage medium 43, by receiving data and reports from the communications interface 42, and by retrieving data and instructions from the storage medium 43. Other components, as well as the related functionality, of the wireless terminal 11a, 11b, 11c, 11d are omitted in order not to obscure the concepts presented herein.

Figure 2D:
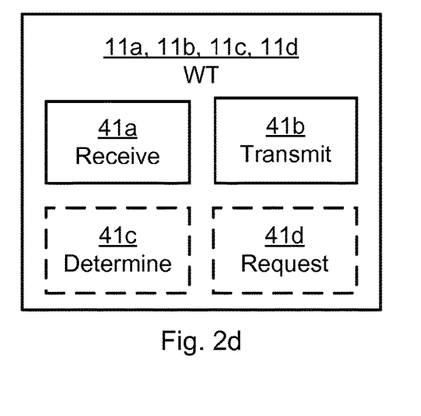
FIG. 2d is a schematic diagram showing functional modules of a wireless terminal according to an embodiment.

FIG. 2d schematically illustrates, in terms of a number of functional modules, the components of a wireless terminal 11a, 11b, 11c, 11d according to an embodiment. The wireless terminal 11a, 11b, 11c, 11d of FIG. 2d comprises a number of functional modules; a receive module 41a, and a transmit module 41b. The wireless terminal 11a, 11b, 11c, 11d of FIG. 2d may further comprises a number of optional functional modules, such as any of a determine module 41c, and a request module 41d. The functionality of each functional module 41a-d will be further disclosed below in the context of which the functional modules 41a-d may be used. In general terms, each functional module 41a-d may be implemented in hardware or in software. The processing unit 41 may thus be arranged to from the storage medium 43 fetch instructions as provided by a functional module 41a-d and to execute these instructions, thereby performing any steps as will be disclosed hereinafter.

Figure 3:
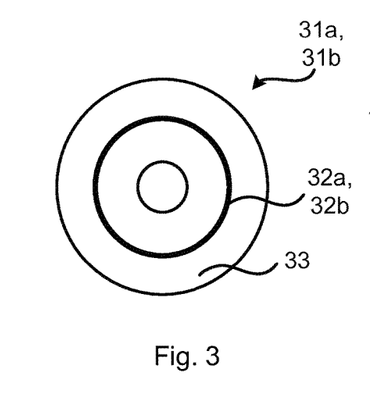
FIG. 3 shows one example of a computer program product comprising computer readable means according to an embodiment.
Figures 5, 6:
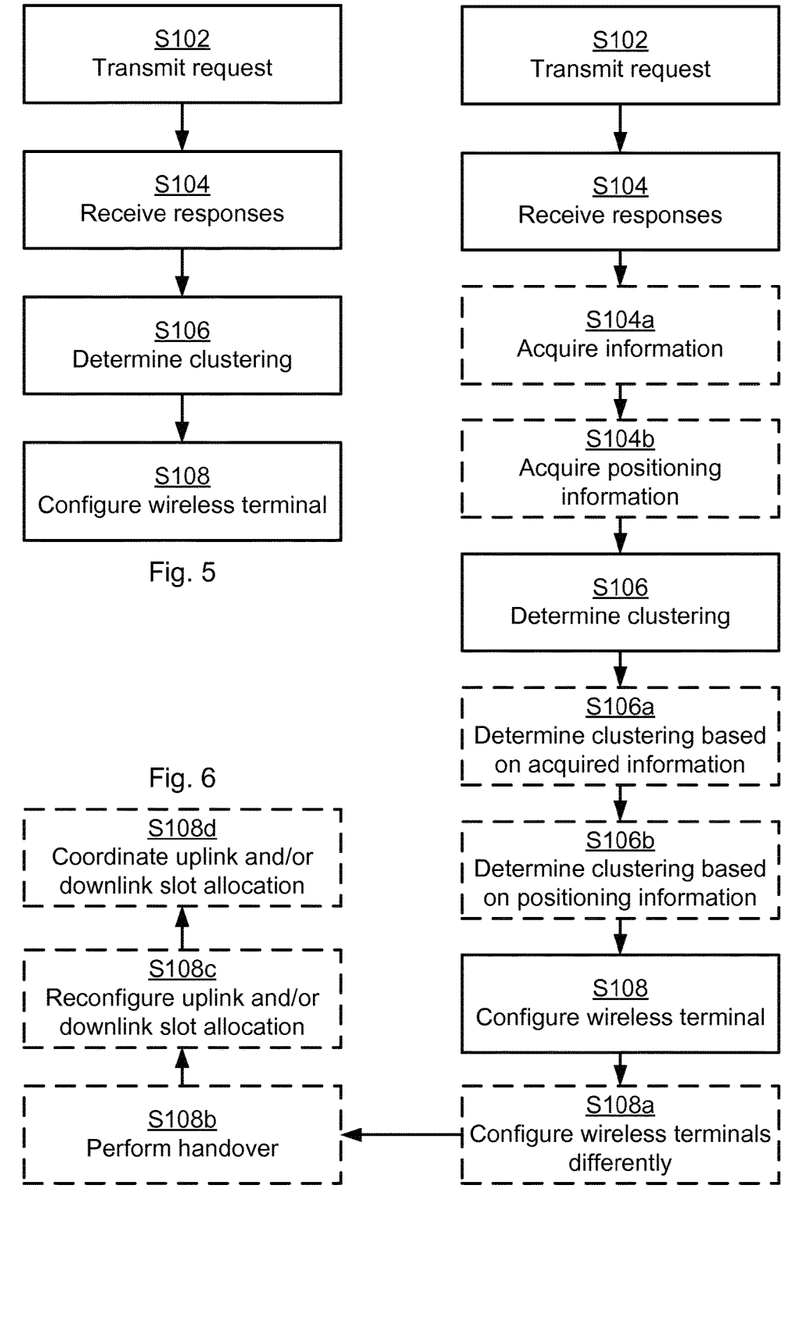
FIGS. 5-10 are flowcharts of methods according to embodiments.
Figure 7:
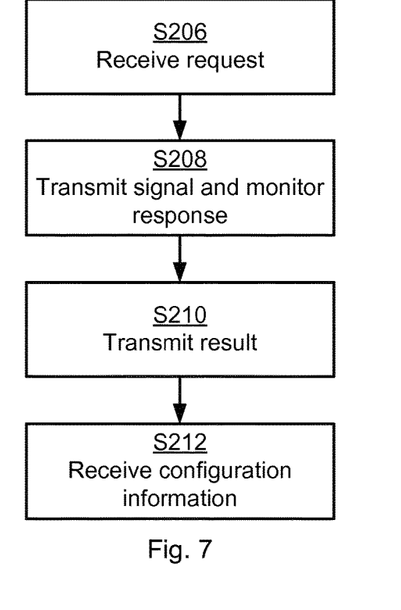
Figure 8:
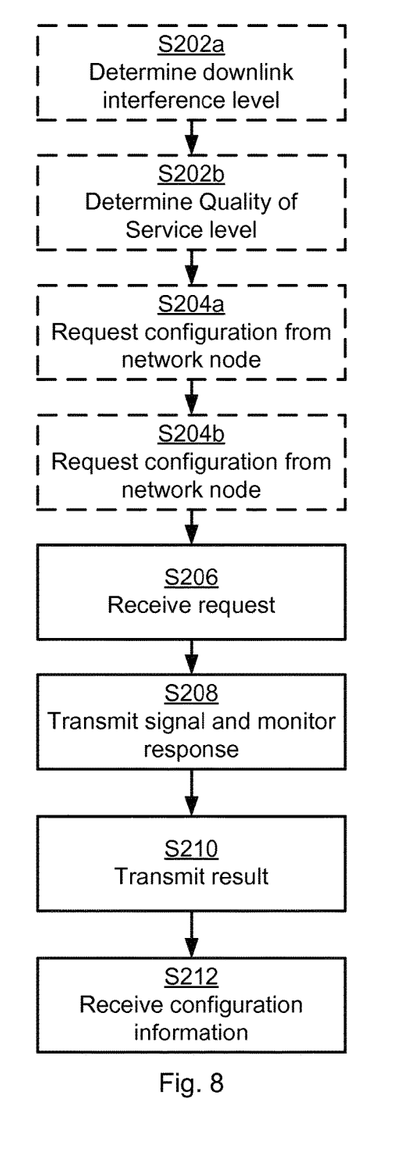
Figure 9:
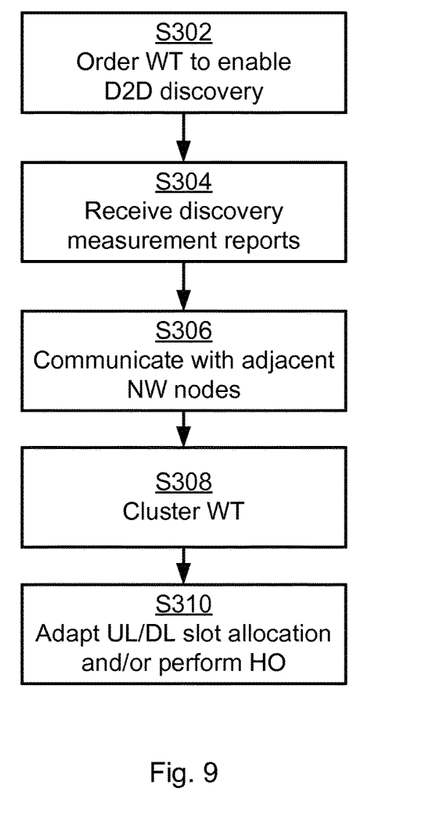
Figure 10:
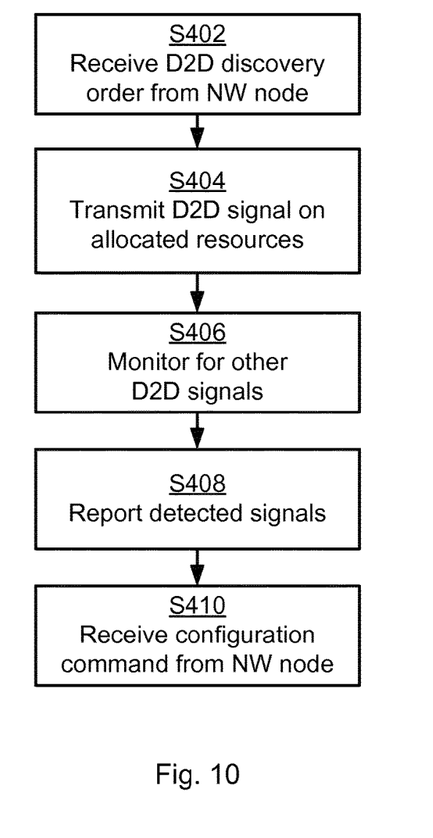

FIGS. 5, 6, and 9 are flow chart illustrating embodiments of methods for configuring wireless terminals 11a, 11b, 11c, 11d as performed by the network node 12a. FIGS. 7, 8, and 10 are flow chart illustrating embodiments of methods for configuring wireless terminals 11a, 11b, 11c, 11d as performed by the wireless terminal 11a, 11b, 11c, 11d. The methods are advantageously provided as computer programs 32a, 32b. FIG. 3 shows one example of a computer program product 31a, 31b comprising computer readable means 33. On this computer readable means 33, a computer program 32a can be stored, which computer program 32a can cause the processing unit 21 and thereto operatively coupled entities and devices, such as the communications interface 22 and the storage medium 23, to execute methods according to embodiments described herein as performed by the network node 12a. The computer program 32a and/or computer program product 31a may thus provide means for performing any steps as herein disclosed as performed by the network node 12a. On the computer readable means 33, a computer program 32b can be stored, which computer program 32b can cause the processing unit 41 and thereto operatively coupled entities and devices, such as the communications interface 42 and the storage medium 43, to execute methods according to embodiments described herein as performed by the wireless terminal 11a-d. The computer program 32b and/or computer program product 31b may thus provide means for performing any steps as herein disclosed as performed by the wireless terminal 11a-d.

In the example of FIG. 3, the computer program product 31a, 31b is illustrated as an optical disc, such as a CD (compact disc) or a DVD (digital versatile disc) or a Blu-Ray disc. The computer program product 31a, 31b could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory. Thus, while the computer programs 32a, 32b are here schematically shown as a track on the depicted optical disk, the computer programs 32a, 32b can be stored in any way which is suitable for the computer program product 31a, 31b.

The herein disclosed embodiments are based on allowing different wireless terminals 11a, 11b, 11c, 11d to benefit from dynamic UL/DL configuration by allocating the different wireless terminals 11a, 11b, 11c, 11d to suitable clusters 16a, 16b in a way that minimized interference between the wireless terminals 11a, 11b, 11c, 11d. The determination of whether the transmission from one wireless terminal 11a, 11b, 11c, 11d is expected to cause significant interference for one or more other wireless terminals 11a, 11b, 11c, 11d may be based on estimating the propagation attenuation between the transmitting wireless terminal 11a, 11b, 11c, 11d and potential interfered wireless terminals 11a, 11b, 11c, 11d. Preferably, such estimations may take advantage of mechanisms implemented in device-to-device (D2D) communications and therefore readily available in the wireless terminals 11a, 11b, 11c, 11d. D2D discovery may then be used to determine the actual interference conditions that may be used to cluster different wireless terminals 11a, 11b, 11c, 11d. D2D may here refer to network assisted D2D using for instance 3GPP technology, but it may also refer to a connection using another technology, such as Wi-Fi or Bluetooth. In addition or alternatively, the estimation may also take advantage of positioning information for one or more of the wireless terminals 11a, 11b, 11c, 11d. Specifically, in a hotspot scenario where many pico-cells are deployed inside a not-so-large hotspot area and potentially overlap with one another, it may be advantageous to connect different wireless terminals 11a, 11b, 11c, 11d to different network nodes 12a, 12b not only based on the propagation characteristics between the wireless terminal 11a, 11b, 11c, 11d and the potential network nodes 12a, 12b to connect to, but also based on the device-to-device interference seen between the wireless terminals 11a, 11b, 11c, 11d.

Reference is now made to FIG. 5 illustrating a method for configuring wireless terminals according to an embodiment. The method is performed by a network node 12a.

The processing unit 21 of the network node 12a is arranged to, in a step S102, transmit a request to wireless terminals 11a, 11b operatively connected to the network node. The request involves the wireless terminals 11a, 11b to detect possible other wireless terminals 11c, 11d which are located within short-range communications range 13a, 13b of the wireless terminals 11a, 11b. The request may comprise explicit instructions for the wireless terminals 11a, 11b to detect possible other wireless terminals 11c, 11d by using a short-range communications technology. Examples of short-range communications technologies will be provided below.

Once the request has been transmitted the network node 12a awaits any responses thereto. The processing unit 21 of the network node 12a is arranged to, in a step S104, receive responses to the request. The responses comprises information of detected other wireless terminals 11c, 11d. It could be that the information reveals that there are no such other wireless terminals 11c, 11d detected by the wireless terminals 11a, 11b. However, it is assumed that at least one such other wireless terminal 11c, 11d is detected by the wireless terminals 11a, 11b.

The network node 12a then uses the received information to configure at least one of the wireless terminals 11a, 11b. In order to do so the network node 12a determines clustering. Particularly, the processing unit 21 of the network node 12*a* is arranged to, in a step S106, determine clustering of the wireless terminals 11*a*, 11*b* (and optionally also the other wireless terminals 11*c*, 11*d*) based on the responses. The processing unit 21 of the network node 12*a* is then arranged to, in a step S108, configure at least one of the wireless terminals 11*a*, 11*b* according to the determined clustering. Different examples of configuring and clustering will be provided below.

Reference is now made to FIG. 7 illustrating a method for configuring wireless terminals according to an embodiment. The method is performed by a wireless terminal 11*b*.

The processing unit 41 of the wireless terminal 11*b* is arranged to, in a step S206, receive a request from a network node 12*a* to which the wireless device 11*b* is operatively connected. The request may have been transmitted by the network node as in step S102. The request thus involves the wireless terminal 11*b* to detect other wireless terminals 11*a*, 11*c*, 11*d* within short-range communications range 13*b* of the wireless terminal 11*b*. The request may comprise explicit instructions for the wireless terminal 11*b* to detect possible other wireless terminals 11*a*, 11*c*, 11*d* by using a short-range communications technology. Examples of short-range communications technologies will be provided below.

The wireless terminal 11*b* then performs actions to comply with the request by transmitting probing signals and monitoring possible responses to the probing signals. Particularly, the processing unit 41 of the wireless terminal 11*b* is arranged to, in a step S208, transmit a probing or discovery signal using an available short-range communications technology and to monitor any responses thereto from the other wireless terminals 11*a*, 11*c*, 11*d*.

A result of the monitoring is then transmitted to the network node 12*a*. The processing unit 41 of the wireless terminal 11*b* is thus arranged to, in a step S210, transmit a result of the monitoring to the network node 12*a*. The result comprises information of any detected other wireless terminals 11*a*, 11*c*, 11*d*. It could be that the monitoring reveals that there are no such other wireless terminals 11*a*, 11*c*, 11*d* detected by the wireless terminal 11*b*. However, it is assumed that at least one such other wireless terminal 11*a*, 11*c*, 11*d* is detected by the wireless terminals 11*b*.

The processing unit 41 of the wireless terminal 11*b* is arranged to, in a step S212, receive configuration information based on the result from the network node 12*a*. The configuration information may have been transmitted by the network node as in step S108.

In general terms, the probing or discovery signal as transmitted in step S208 may be regarded as any type of signal transmitted by the wireless terminal 11*b* for possible other wireless terminals 11*a*, 11*c*, 11*d* within short-range communications range 13*b* of the wireless terminal 11*b* to react to. In this respect, react to means sending a response to the wireless terminal 11*b*. The response may at least comprise an acknowledgement of having received the probing or discovery signal. As is understood by the skilled person, any response to the probing or discovery signal as transmitted in step S208 may depend on the capabilities of the possible other wireless terminals 11*a*, 11*c*, 11*d*. For example, in general terms it may be required that the other wireless terminals 11*a*, 11*c*, 11*d* support reception of the short-range communications technology used by the wireless terminal 11*b* to transmit the probing or discovery signal. Optionally, the probing or discovery signal as transmitted in step S208 may by the wireless terminal 11*b* be transmitted using more than one short-range communications technology (if available). This may increase the chance of transmitting the probing or discovery signal in a format which possible other wireless terminals 11*a*, 11*c*, 11*d* are capable of reacting to.

Reference is now made to FIG. 6 illustrating methods for configuring wireless terminals as performed by the network node 12*a* according to further embodiments.

According to one embodiment, the network node 12*a* may, upon detecting continuous DL errors, e.g. via receiving DL NACK (negative-acknowledgement) signals for consecutive sub frames, instruct the interfered wireless terminal 11*b* to perform D2D discovery. Hence, the transmitting in step S102 may be triggered by the network node 12*a* detecting downlink transmission errors being larger than a first threshold level. Particularly, the request in step S102 may only be transmitted to those of the wireless terminals 11*a*, 11*b* operatively connected to the network node 12*b* which are associated with at least one of uplink and downlink transmission error rates being larger than a second threshold level. Additionally or alternatively, the request in step S102 may only be transmitted to those wireless terminals 11*a*, 11*b* operatively connected to the network node 12*a* which experience a Quality of Service (QoS) level lower than a third threshold level.

In order to obtain coordinated determination of at least one of uplink and downlink slot allocation with at least one other network node 1213 operatively connected to the network node 12*a* the network node 12*a* and the at least one other network node 12*b* may have to exchange information. For example, according to an embodiment the processing unit 21 of the network node 12*a* is arranged to, in an optional step S104*a*, acquire information regarding further responses of the other wireless terminals 11*c*, 11*d* from at least one other network node 12*b* operatively connected to the network node 12*a*. The clustering in step S106 may then be determined, in an optional step S106*a*, also based on the acquired information.

Further, the clustering may additionally be based on positioning information. In more detail, the potential interference between the wireless terminals 11*a*, 11*b*, 11*c*, 11*d* may be based on the location of the wireless terminals 11*a*, 11*b*, 11*c*, 11*d*. The location information may be obtained from the Global Positioning System (GPS), WiFi, or by some other means. The network node 12*a* may then use this location information to estimate the amount of interference that one wireless terminal 11*a*, 11*b*, 11*c*, 11*d* will cause to another wireless terminal 11*a*, 11*b*, 11*c*, 11*d*. Further, location information may be used to pre-select wireless terminals 11*a*, 11*b*, 11*c*, 11*d* within a specific geographical area (as determined by location information, such as GPS coordinates). The request as transmitted in step S102 may then only be transmitted to the pre-selected wireless terminals 11*a*, 11*b*, 11*c*, 11*d*. Hence this may reduce the number of wireless terminals 11*a*, 11*b*, 11*c*, 11*d* considered to be clustered in step S106 and configured in step S108. Hence, according to an embodiment the processing unit 21 of the network node 12*a* is arranged to, in an optional step S104*b*, acquire positioning information, such as GPS measurements, about the wireless terminals 11*a*, 11*b*, 11*c* operatively connected to the network node 12*a*. The processing unit 21 of the network node 12*a* may then be arranged to, in an optional step S106*b* determine the clustering as in step S106 also based on the acquired positioning information. Thus, the network node 12*a* may make use of the location information and feedback of wireless terminals 11*a*, 11*b*, 11*c*, 11*d* after receiving the probing signal in a combined manner to determine the clusters 16*a*, 16*b*.

When a group of closely spaced wireless terminals 11*a*, 11*b*, 11*c*, 11*d* are identified, then the clustering of low power nodes can be performed by clustering the network nodes 12a, 12b that serve wireless terminals 11a, 11b, 11c, 11d in one cluster, thereby improving the interference situations between closely spaced wireless terminals 11a, 11b, 11c, 11d. Particularly, according to an embodiment the clustering involves dividing the wireless terminals 11a, 11b, 11c, 11d into at least two clusters 16a, 16b. The configuring in step S108 may then comprise an optional step S108a of configuring the wireless terminals 11a, 11b, 11c in one of the at least two clusters 16a, 16b differently than the wireless terminals 11d in another one of the at least two clusters 16a, 16b.

In order to accomplish the above disclosed configuring, one or more wireless terminals 11a, 11b, 11c, 11d may be handed over from a current serving network node 12a to a future serving network node 12b. The configuring in step S108 may thus comprise an optional step 108b of performing handover of at least one wireless terminal 11a, 11b, 11c, 11d. The thus handed over at least one wireless terminal 11a, 11b, 11c, 11d is prior to the configuring in step S108 either operatively connected to the network node 12a or is one of the other wireless terminals 11c, 11d.

For example, it may be ensured that the network nodes 12a, 12b to which mutually coupled wireless terminals 11a, 11b, 11c are connected to (i.e., wireless terminals 11a, 11b, 11c which are operatively connected to the same network node 12a, 12b and which belong to the same cluster) use the same UL/DL configuration. The configuring in step S108 may thus comprise an optional step S108c of reconfiguring at least one of uplink and downlink slot allocation for at least one wireless terminal 11a, 11b, 11c, 11d operatively connected to the network node 12a, 12b. The configuring in step S108 may additionally or alternatively comprise an optional step S108d of coordinating determination of at least one of uplink and downlink slot allocation with at least one other network node 12b operatively connected to the network node 12a. As noted above, the clustering may involve dividing the wireless terminals 11a, 11b, 11c, 11d into at least two clusters 16a, 16b, and the coordinating in step S108d may then only be performed in a case one of the at least two clusters comprises at least one wireless terminal 11a, 11b operatively connected to the network node 12a and at least one of the other wireless terminals 11c.

In general terms, in theory, TDD allows for a flexible allocation of UL and DL resources such that if the traffic suddenly changes the UL/DL resources can be adapted to this. If the traffic would change for all connected wireless terminals 11a, 11b, 11c, 11d this would be feasible as the UL/DL allocation could be changed for all network nodes 12a, 12b. However, in practice the traffic changes are per wireless terminal 11a, 11b, 11c, 11d basis. Changing UL/DL allocation for some of the network nodes 12a, 12b but not for others network nodes 12a, 12b may then potentially cause detrimental interference between the wireless terminals 11a, 11b, 11c, 11d. Specifically, if one wireless terminal 11a, 11b, 11c, 11d is transmitting at the same time as another close by (in geographical sense) wireless terminal 11a, 11b, 11c, 11d is receiving, the latter wireless terminal 11a, 11b, 11c, 11d may suffer severe interference. However, as long as wireless terminal 11a, 11b, 11c, 11d that are close enough (for example within short-range communications of each other) to suffer from device-to-device interference are using the same UL/DL configuration there may not be any such problems. According embodiments as herein disclosed it is ensured that wireless terminal 11a, 11b, 11c, 11d that potentially may interfere with each other are using the same UL/DL configuration.

UL/DL configuration of one or more network nodes 12a, 12b may be changed once it is established that a certain network node 12a, 12b should join certain cluster of network nodes 12a, 12b, or the certain network node 12a, 12b should join another network node 12a, 12b to create a new cluster of network nodes 12a, 12b.

In a hotspot scenario where many pico-cells are deployed inside a not-so-large hotspot area and potentially overlap with one another, it may be beneficial to connect different wireless terminals 11a, 11b, 11c, 11d to different network nodes 12a, 12b not only based on the propagation characteristics between the wireless terminal 11a, 11b, 11c, 11d and the potential network nodes 12a, 12b to connect to, but also based on the device-to-device interference seen between wireless terminals 11a, 11b, 11c, 11d. Wireless terminals 11a, 11b, 11c, 11d which are interfered may either be operatively connected to the same network node 12a or to another network node 12b with the same UL/DL configuration, whereas no such requirements may be imposed on wireless terminals 11a, 11b, 11c, 11d that are not interfered by any other nearby wireless terminals.

Reference is now made to FIG. 8 illustrating methods for configuring wireless terminals as performed by the wireless terminal 11b according to further embodiments.

According to one embodiment, the wireless terminal 11b in step S208 transmits probing signals in order to determine the actual interference conditions that in step S106 may be used to cluster different wireless terminals 11a, 11b, 11c, 11d. Suppose some wireless terminals 11a, 11b, 11c, 11d would be better supported if more UL resources would be used, whereas other wireless terminals 11a, 11b, 11c, 11d would be better supported with more DL resources. In the attempt of partition the different wireless terminals 11a, 11b, 11c, 11d among the network nodes 12a, 12b it may then be beneficial to know if two different wireless terminals of the wireless terminals 11a, 11b, 11c, 11d may interfere with one another if different UL/DL configurations are allocated to them. Thus, a wireless terminal 11a, 11b, 11c, 11d which potentially would be allocated more UL resources may first send a probing signal to determine which other wireless terminals 11a, 11b, 11c, 11d would be interfered. In this way, a group of closely spaced wireless terminals 11a, 11b, 11c, 11d can be identified, and a cluster of wireless terminals 11a, 11b, 11c, 11d may be determined as in step S106.

According to one embodiment, the wireless terminal 11b may, upon detecting large DL interferences, request its serving network node 12a to perform device-to-device (D2D) discovery in its vicinity.

As noted above, device-to-device interference conditions may be determined based on the wireless terminals 11a, 11b sending at least one D2D probing or discovery signal. This has the advantage that the entire procedure is handled using the same wireless technology. However, in general terms, the short-range communications technology may be at least one of WiFi, Bluetooth, and radio-frequency identification, and may or may not involve the wireless terminals 11a, 11b operatively connected to the network node 12a to perform D2D discovery. It could for instance be that the wireless terminals 11a, 11b, 11c, 11d are already operatively connected using Bluetooth (or any other short-range communications technology) and then the pathloss can be easily estimated, or a Bluetooth connection can be initiated for the sole purpose of determining the path-loss. Further, if only some of the wireless terminals 11a, 11b, 11c, 11d support D2D communication, e.g. Bluetooth can be used as a complement to D2D probing signalling as described above.

As noted above, the configuring may involve handover (see, step S108*b*, FIG. 6). The configuration information as received by the wireless network node 11*b* in step S212 may thus comprise a handover order.

As noted above, the configuring may relate to uplink or downlink slot allocation. The configuration information as received by the wireless network node 11*b* in step S212 may thus comprise at least one of an uplink slot allocation order and a downlink slot allocation order.

As noted above, the request as transmitted in step S102 may be triggered by downlink interference. According to an embodiment the processing unit 41 of the wireless terminal 11*b* is therefore arranged to, in an optional step S202*a*, determine a downlink interference level to be larger than a fourth threshold level, and in response thereto requesting, in an optional step S204*a*, the network node 12*a* to perform configuration of at least the wireless terminal 11*b*.

As noted above, the request as transmitted in step S102 in FIG. 6 may be triggered by a QoS level. According to an embodiment the processing unit 41 of the wireless terminal 11*b* is arranged to, in an optional step S202*b*, determine a QoS level to be lower than a third threshold level, and in response thereto requesting, in an optional step S204*b*, the network node 12*a* to perform configuration of at least the wireless terminal 11*b*.

Returning now to the communications network 10 of FIG. 1. It is assumed that TDD is used and that the network nodes 12*a*, 12*b* have a connection with each other, over say an X2 interface. Assume now that, initially, wireless terminals 11*a*, 11*b*, 11*c* are operatively connected to network node 12*a* and wireless terminal 111*d* is operatively connected to network node 12*b*. Assume further that wireless device tic needs more UL slots than is provided by its current UL/DL allocation. In order to make sure that wireless terminals 11*a*, 11*b*, 11*c*, 11*d* transmitting in extended UL slots do not interfere with each other, potential device-to-device interference is determined by e.g. D2D proximity detection. As in step S102 the network nodes 12*a*, 12*b* may thus order the wireless terminals 11*a*, 11*b*, 11*c*, 11*d* to transmit a D2D probing or discovery signal. The corresponding coverage of the probing or discovery signal is displayed in FIG. 1 by means of the short-range communications 13*a*, 13*b*, 13*c*, 13*d*. The D2D transmission power is associated with the TX power for cellular communication, and hence mimic interference risk (device-to-device coupling) if a particular wireless terminal 11*a*, 11*b*, 11*c*, 11*d* starts an UL transmission in an extended UL slot. According to the illustrative example of FIG. 1, the wireless terminals 11*a*, 11*b*, 11*c*, 11*d* are pair-wise within short-range communications range of each other. Particularly, wireless terminals 11*c* and 11*d* are within short-range communications range of each other. The network nodes 12*a*, 12*b* therefore orders a handover, of say wireless terminal 11*c* to network node 12*b*, and then the network node 12*a* thus manages wireless terminals 11*a*, 11*b*, whilst network node 12*b* manages wireless terminals 11*c*, 11*d*. Network node 12*b* may now reconfigure the UL/DL slot allocation in order to fit the need for wireless terminal 11*c* (and then take this into account when scheduling resources for wireless terminal 11*d*). Assuming that the short-range communications ranges 13*b* and 13*c* are non-overlapping (thus resulting in that cluster 16*a* would comprise wireless terminals 11*a*, 11*b* and cluster 16*b* would comprise wireless terminals 11*c*, 11*d*), one advantage with this approach would be that the clustering makes the scheduling of extra UL slots easy, since wireless terminals 11*a*, 11*b*, and 11*c*, 11*d*, respectively, potentially interfered by an extra UL slot are now controlled by the same network node 12*a*, 12*b*, respectively, that configures the extra UL slot, therefore simplifying the scheduling coordination and minimizing the risk for interference.

Two particular embodiments for configuring wireless terminals 11*a*, 11*b*, 11*c*, 11*d* will now be disclosed.

Reference is now made to the flowchart of FIG. 9 disclosing a method for configuring wireless terminals 11*a*, 11*b*, 11*c*, 11*d* as performed by a network node 12*a*.

S302: The network node 12*a* orders operatively connected wireless terminals 11*a*, 11*b* to enable D2D discovery. As noted above, the reason may be that some wireless terminals 11*a*, 11*b* may request extra UL slot allocation (assuming a TDD system). The D2D discovery may also be ordered or requested by another network node 12*b* operatively connected to the network node 12*a* (for example via the X2 interface). The D2D discovery may be LTE D2D discovery in the same frequency band as the UL transmission, but may also be another carrier frequency or another communications technology (such as Bluetooth or WiFi). The order may include information about when to transmit and receive probing signals, transmission power, time and/or frequency resources to use etc. One way to implement step S302 is to perform step S102.

S304: The network node 12*a* receives discovery measurement reports from operatively connected wireless terminals 11*a*, 11*b*. This may include information of discovered wireless terminals 11*c*, 11*d* (device ID), received signal levels etc. One way to implement step S304 is to perform any of step S104 and S104*b*.

S306: The network node 12*a* communicates with at least one other network node 12*b* and discovery measurement reports are exchanged. In an embodiment, a central control unit controlling all adjacent network nodes 12*a*, 12*b* may receive the discovery measurement reports. One way to implement step S36 is to perform step S104*a*.

S308: Clustering of the wireless terminals 11*a*, 11*b*, 11*c*, 11*d* is determined. Clusters 16*a*, 16*b* are based on the device-to-device coupling (interference) as disclosed above. The network nodes 12*a*, 12*b* exchange information about the clusters 16*a*, 16*b* and initiate handover of any wireless terminal 11*c* not connected to the network node 12*a* they should according to the cluster decisions. One way to implement step S308 is to perform any of step S106, S108, S108*a*, and S108*b*.

S310: Once the clustering is finalized, the network node 12*a* may optionally reconfigure the UL/DL slot allocation (if that was the reason for the re-clustering). If cell re-selection is not possible to be performed, then the network nodes 12*a*, 12*b* may coordinate the UL/DL configurations among themselves. One way to implement step S310 is to perform any of step S108*c* and S108*d*.

Reference is now made to the flowchart of FIG. 10 disclosing a method for configuring wireless terminals 11*a*, 11*b*, 11*c*, 11*d* as performed by a wireless terminal 11*b*.

S402: A wireless terminal 11*b* operatively connected to a network node 12*a* receive a D2D discovery order from the network node 12*a*. One way to implement step S402 is to perform step S206.

S404: The wireless terminal 11*b* transmit a D2D probing signal according to the received discovery order. One way to implement step S404 is to perform step S208.

S406: The wireless terminal 11*b* monitor for other D2D probing signals transmitted from other wireless terminals 11*a*, 11*c*, 11*d*. One way to implement step S406 is to perform step S208.

S408: The wireless terminal 11*b* reports detected probing signals to the network node 12*a*. The report may include device ID, signal strength etc.). One way to implement step S408 is to perform step S210.

S410: The wireless terminal 11b may optionally receive a handover order, to initiate a handover to another cell. It may additionally or alternatively receive reconfiguration of UL/DL slot configuration form the network node 12a. One way to implement step S410 is to perform step S212.

In summary, wireless terminals 11a, 11b, 11c, 11d experiencing mutual interferences may be operatively connected to the same network node 12a, 12b, or to another network node 12a, 12b with similar UL/DL configurations. This is opposed to prior art where the wireless terminals 11a, 11b, 11c, 11d typically are operatively connected to the network node 12a, 12b which has the most favorable propagation conditions.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

The invention claimed is:

1. A method for configuring wireless terminals, the method being performed by a network node, comprising the steps of:
   transmitting a request to wireless terminals operatively connected to the network node to detect other wireless terminals within short-range communications range of said wireless terminals;
   receiving responses to said request, the responses comprising information of detected said other wireless terminals;
   using the information of the other nodes to allocate each of the wireless terminals and the other wireless terminals into one of at least two clusters, each cluster being associated with a respective different one of a group of network nodes comprising the network node and at least one other network node that is operatively connected to the network node; and
   configuring at least one of said wireless terminals or at least one of the other wireless terminals according to said determined allocating.

2. The method according to claim 1, wherein said configuring comprises:
   configuring said wireless terminals in one of said at least two clusters differently than said wireless terminals in another one of said at least two clusters.

3. The method according to claim 1, wherein said configuring comprises:
   performing handover of at least one of the wireless terminals or of the other wireless terminals from one network node of the group of network nodes to another network node of the group of network nodes.

4. The method according to claim 3, wherein said handed over wireless terminal prior to said configuring is either operatively connected to said network node or is one of said other wireless terminals.

5. The method according to claim 1, wherein said configuring comprises:
   reconfiguring at least one of uplink and downlink slot allocation for at least one wireless terminal operatively connected to said network node.

6. The method according to claim 1, wherein said configuring comprises:
   coordinating determination of at least one of uplink and downlink slot allocation with at least one other network node operatively connected to said network node.

7. The method according to claim 6, wherein said allocating involves dividing said wireless terminals into at least two clusters, and wherein said coordinating only is performed in a case one of said at least two clusters comprises at least one wireless terminal operatively connected to the network node and at least one of said other wireless terminals.

8. The method according to claim 1, wherein said transmitting is triggered by detecting downlink transmission errors being larger than a first threshold level.

9. The method according to claim 1, wherein said request only is transmitted to those of said wireless terminals operatively connected to the network node which are associated with at least one of uplink and downlink transmission error rates being larger than a second threshold level.

10. The method according to claim 1, wherein said request only is transmitted to those wireless terminals operatively connected to the network node which experience a Quality of Service level lower than a third threshold level.

11. The method according to claim 1, further comprising:
    acquiring information regarding further responses of said other wireless terminals from at least one other network node operatively connected to said network node; and
    determining said allocating also based on said acquired information.

12. The method according to claim 1, further comprising:
    acquiring positioning information, such as Global Positioning System measurements, about said wireless terminals operatively connected to the network node; and
    determining said allocating also based on said acquired positioning information.

13. A method for configuring a wireless terminal, the method being performed by the wireless terminal, comprising the steps of:
    receiving a request from a network node to which the wireless device is operatively connected to detect other wireless terminals within short-range communications range of said wireless terminal;
    transmitting a probing signal using an available short-range communications technology and monitoring any responses thereto from said other wireless terminals;
    transmitting a result of said monitoring to said network node, said result comprising information of detected said other wireless terminals; and
    receiving configuration information based on said result from said network node, wherein the configuration information configures the wireless terminal for service provided by the network node or by an other network node that is operatively connected to the network node.

14. The method according to claim 13, wherein said configuration information comprises a handover order.

15. The method according to claim 13, wherein said configuration information comprises at least one of an uplink slot allocation order and a downlink slot allocation order.

16. The method according to claim 13, further comprising:
    determining a downlink interference level to be larger than a fourth threshold level; and in response thereto:
    requesting said network node to perform configuration of at least the wireless terminal.

17. The method according to claim 13, further comprising:
    determining a Quality of Service level to be lower than a third threshold level; and in response thereto:
    requesting said network node to perform configuration of at least the wireless terminal.

18. The method according to claim 13, wherein said available short-range radio access technology is at least one of WiFi, Bluetooth, and radio-frequency identification, and wherein using said available short-range radio access technology involves performing D2D discovery.

19. A network node for configuring wireless terminals, the network node comprising a processing unit and a non-transitory computer readable storage medium, said non-transitory computer readable storage medium comprising instructions executable by said processing unit whereby said network node is operative to:
- transmit a request to wireless terminals operatively connected to the network node to detect other wireless terminals within short-range communications range of said wireless terminals;
- receive responses to said request, the responses comprising information of detected said other wireless terminals;
- use the information of the other nodes to allocate each of the wireless terminals and the other wireless terminals into one of at least two clusters, each cluster being associated with a respective different one of a group of network nodes comprising the network node and at least one other network node that is operatively connected to the network node; and
- configure at least one of said wireless terminals or at least one of the other wireless terminals according to said determined allocating.

20. A wireless terminal for configuring said wireless terminal, the wireless terminal comprising a processing unit and a non-transitory computer readable storage medium, said non-transitory computer readable storage medium comprising instructions executable by said processing unit whereby said wireless terminal is operative to:
- receive a request from a network node to which the wireless device is operatively connected to detect other wireless terminals within short-range communications range of said wireless terminal;
- transmit a probing signal using an available short-range communications technology and monitor any responses thereto from said other wireless terminals;
- transmit a result of said monitoring to said network node, said result comprising information of detected said other wireless terminals; and
- receive configuration information based on said result from said network node, wherein the configuration information configures the wireless terminal for service provided by the network node or by an other network node that is operatively connected to the network node.

21. A nontransitory computer readable storage medium comprising a computer program for configuring wireless terminals, the computer program comprising computer code which, when run on a network node, causes the network node to:
- transmit a request to wireless terminals operatively connected to the network node to detect other wireless terminals within short-range communications range of said wireless terminals;
- receive responses to said request, the responses comprising information of detected said other wireless terminals;
- use the information of the other nodes to allocate each of the wireless terminals and the other wireless terminals into one of at least two clusters, each cluster being associated with a respective different one of a group of network nodes comprising the network node and at least one other network node that is operatively connected to the network node; and
- configure at least one of said wireless terminals or at least one of the other wireless terminals according to said determined allocating.

22. A nontransitory computer readable storage medium comprising a computer program for configuring wireless terminals, the computer program comprising computer code which, when run on a wireless terminal, causes the wireless terminal to:
- receive a request from a network node to which the wireless device is operatively connected to detect other wireless terminals within short-range communications range of said wireless terminal;
- transmit a probing signal using an available short-range communications technology and monitoring any responses thereto from said other wireless terminals;
- transmit a result of said monitoring to said network node, said result comprising information of detected said other wireless terminals; and
- receive configuration information based on said result from said network node, wherein the configuration information configures the wireless terminal for service provided by the network node or by an other network node that is operatively connected to the network node.

* * * * *